2,745,763

REFRACTORY COMPOSITION FOR JOURNALS, BEARINGS AND THE LIKE

Herbert F. G. Ueltz, Worcester, Mass., assignor to Norton Company, Worcester, Mass., a corporation of Massachusetts No Drawing. Application December 14, 1953, Serial No. 398,232

2 Claims. (Cl. 106—65)

The invention relates to refractory compositions for journals, bearings and the like.

One object of the invention is to provide a journal or bearing material which can be run very hot and will not seize. Another object of the invention is to provide a self-lubricating journal or bearing material capable of withstanding extremely high temperatures, such as temperatures which would melt most metals. Another object of the invention is to provide a journal or bearing material for use in apparatus operated at very high temperatures where the journal or bearing is hot not from its own friction but from other causes and nevertheless does not deteriorate. By bearings, I mean to include thrust bearings, bearings for reciprocating parts, lateral bearings, and other varieties of supporting elements for moving parts.

Other objects will be in part obvious or in part pointed out hereinafter.

Using an induction furnace, I have hot pressed pieces from a mixture of 95% aluminum oxide fines and 5% boron nitride powder, percentages being by weight. The temperature was about 1750° C. (melting point of alumina is 2015° C. plus or minus 10 degrees) and the pressure was two and a half tons per square inch. As the boron nitride sublimes at 3000° C. this material is refractory up to just short of the softening point of alumina, which begins to soften around 1800° C.

My composition can be used to make a bearing to journal a steel shaft for mechanisms for furnaces, crucibles, kilns or the like and the bearing will be more refractory than the steel. Nevertheless the bearing will have lubricating properties so that even though it is obviously impossible to use oil, the shaft of steel will be freely rotatable or slidable at all times. Furthermore bearings of the types indicated can be used with shafts or other elements of molybdenum or other very refractory material so that the apparatus will operate at temperatures above the melting point of steel. Thus this combination is excellent for mechanical elements which have to operate at very high temperatures. If the shaft is resilient, that is to say not brittle, a massive bearing which is brittle can be tolerated. Furthermore the composition can be used to make other mechanical elements where friction is involved. Examples are links, cranks, cams and the like.

Example

A mixture of 95% by weight of ball milled microcrystalline alumina and 5% by weight of boron nitride was thoroughly mixed in a mortar with a pestle. This mixture was then hot pressed in a graphite mold. The size of the mold and the amount of the mixture introduced was such as to produce a disc two inches by one-quarter inch. The molding temperature reached 1750° C. and the pressure at that temperature was two and one-half tons per square inch. The top temperature and pressure were held for of the order of five minutes.

The resulting disc had an abrasion resistance equal to the highest quality of alumina ware as measured by sand blast penetration at 25 pounds per square inch pressure. I ground flats on the disc with a metal bonded diamond grinding wheel which resulted in very smooth non-porous surfaces. The boron nitride gave the ground surfaces a greasy feeling. The disc had a specific gravity of 3.59 but can range between 3.3 and 3.96. Non-porous alumina has a density of 4 grams per cubic centimeter and non-porous boron nitride has a density of 2.2 grams per cubic centimeter.

I repeated the foregoing procedure exactly except that the mixture was 90% of the ball milled microcrystalline alumina and 10% of the boron nitride but the material didn't mold well and the piece was mechanically weak. I, therefore, conclude that 7% is about the upper limit of boron nitride. Less than 2% of boron nitride would not give the results contemplated for this invention.

Less pressure can be used in the manufacture of pieces according to this invention. It will suffice if the pressure is one-half a ton (1,000 pounds) per square inch. There is no upper limit to the pressure except the limit enforced by the strength of the graphite molds, and that of course is variable according to the design of the molds. For some pieces it will be satisfactory to heat the mixture being molded up to 1600° C. The upper limit is the melting point of alumina or just below it. The melting point of alumina is now given by the best authorities as 2015° C. plus or minus 10 degrees. Thus top molding temperature is about 2000° C.

The ball milled microcrystalline alumina was very pure probably being better than 99.5% alumina. The boron nitride was likewise very pure probably being better than 97% boron nitride. The purity of good pieces according to this invention is 99% that is allowing 1% for impurities. For the best results in molding, rather pure microcrystalline alumina is preferred.

I can use for molding an intermediate stage boron nitride containing large amounts of ammonium chloride, boramide and/or borimide and hydrochloric acid. During the molding process, the ammonium chloride, boramide and/or borimide and hydrochloric acid are driven off leaving a very pure boron nitride constituent.

It will thus be seen that there has been provided by this invention a refractory composition for journals, bearings, and the like in which the various objects hereinabove set forth together with many thoroughly practical advantages are successfully achieved. As many possible embodiments might be made of the above invention and as many changes may be made in the embodiment above set forth, it is to be understood that all matter hereinbefore set forth is to be interpreted as illustrative and not in a limiting sense.

I claim:

1. An article of manufacture having a composition which is from 93 to 98 parts of alumina to from 7 to 2 parts of boron nitride, the matter other than alumina and boron nitride limited to 1%, the article having a specific gravity between 3.3 and 3.96.

2. Method of making refractory articles suitable for journals and bearings comprising pressing at at least one-half a ton per square inch pressure and at a temperature from 1600° C. to 2000° C. from 93% to 98% of 99% pure microcrystalline alumina, the remainder to 100% being at least 97% pure boron nitride exclusive of matter which is volatile at 1600° C.

References Cited in the file of this patent

UNITED STATES PATENTS

| | | |
|---|---|---|
| 1,181,800 | Randolph | May 2, 1916 |
| 2,331,232 | Ross | Oct. 5, 1943 |